Oct. 27, 1931.  E. R. GIBBENS  1,829,645
METHOD OF AND PREPARATION FOR COLORING EGGS OR THE LIKE
Filed Dec. 17, 1930
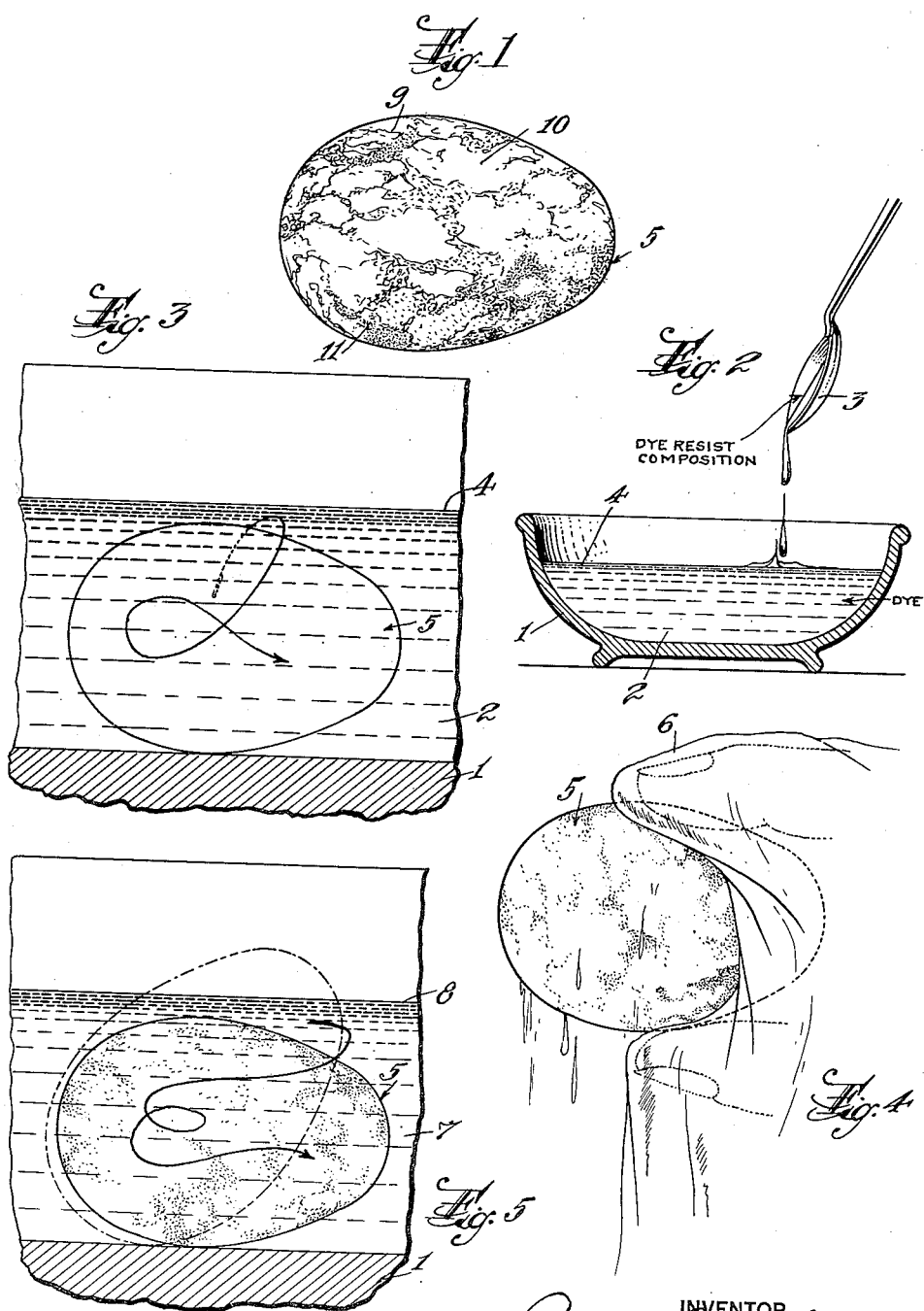
INVENTOR
Emma Riehl Gibbens,
BY
Everett H. Cook.
ATTORNEYS Patented Oct. 27, 1931

1,829,645

UNITED STATES PATENT OFFICE

EMMA RIEHL GIBBENS, OF GODFREY, ILLINOIS, ASSIGNOR TO PAAS DYE COMPANY, OF NEWARK, NEW JERSEY, A CORPORATION OF NEW JERSEY

METHOD OF AND PREPARATION FOR COLORING EGGS OR THE LIKE

Application filed December 17, 1930. Serial No. 502,977.

This invention relates to a method or process of and preparation for coloring eggs or the like to produce marbleized effects, one object of the invention being to provide a novel and improved method of this character wherein the egg or the like is treated by the simple immersion and rolling of the egg in a liquid preparation so that a dye or coloring substance takes effect upon the certain portions of the egg while other portions are unaffected by the coloring substance.

Another object is to provide such a method consisting in immersing and rolling the egg or the like in a preparation comprising a body of liquid coloring material having a layer of liquid or semi-liquid material upon its surface which, as the egg or the like, is immersed, will adhere to and coat certain portions of the egg and prevent the coloring substance from coloring said certain portions, so as to produce a marble-like effect upon the egg, and then wiping dry the egg.

Other objects are to provide a preparation for the purpose described comprising a quantity of liquid dye or coloring substance having a layer of liquid or semi-liquid resist substance such as an oily or greasy substance, for example lard, butter or vegetable oil, which will adhere to the egg and prevent contact with the egg of the dye or coloring material, said resist substance being substantially immiscible with or insoluble in liquid dye or coloring substance and/or of a different specific gravity so as to lie in a layer preferably on the surface of the dyeing or coloring liquid, so that as an egg is immersed in said preparation said resist substance will adhere to some portions of the egg or the like to prevent coloring of said portions, while other portions of the egg will be dyed or colored; and to obtain other advantages and results as will be brought out by the following description.

Referring to the accompanying drawings, in which corresponding and like parts are designated throughout the several views by the same reference characters, Figure 1 is a side elevation of an egg dyed in accordance with my invention;

Figure 2 is a composite view including a receptacle in section and a spoon, showing the manner of making my preparation for dyeing eggs;

Figure 3 is an enlarged fragmentary transverse vertical sectional view through the receptacle having the preparation therein and showing the manner of immersing an egg in the preparation;

Figure 4 is a perspective view illustrating the step of wiping the egg after its immersion in the preparation, and Figure 5 is a view similar to Figure 3 showing the treatment of the egg with a second preparation.

Specifically describing the invention, I may utilize any suitable known dye or coloring solution, containing either an aniline or vegetable dye, for example any of the usual commercial Easter egg dyes. This solution is heated and placed in a receptacle, for example, a cup, a bowl or a deep saucer. In Figure 2 of the drawings the receptacle is designated 1, while the dye or coloring solution is designated 2.

To this dye or coloring solution is added a small quantity of a suitable resist substance, that is, a substance which will adhere to an egg and repel the coloring solution or prevent the coloring solution from taking effect upon the egg. This resist substance may consist of an oily or greasy material such as a vegetable oil, or a mineral oil, or an animal oil or fat, preferably immiscible with and lighter than the dye or coloring solution so as to form a layer upon the surface of the dye or coloring solution. I have found lard and butter to be satisfactory.

After the preparation has been thus compounded, an egg 5 or other object to be colored, is immersed and turned in the preparation, as shown in Figure 3. During this immersion some of the resist substance adheres to certain portions of the egg and prevents the dye or coloring solution from taking effect upon or coloring the egg at said certain portions, while other portions of the egg are dyed or colored in the usual way. Preferably the egg is dry and hot when it is immersed in the preparation, although such is not necessary. After the egg has been dyed with the desired color, it is removed from the preparation and wiped dry with any suitable material 6, as shown in Figure 4 of the drawings. The egg then has a marble-like appearance, being uncolored where the resist substance has adhered to the shell, and having colored spots or areas where the resist substance has not adhered. The color of the spots or areas will depend upon the color of the dye-coloring solution.

If desired, the egg may then be similarly immersed in preparations having dye or coloring solutions of other colors, the resist substance being placed upon the surface of the dye or coloring solution as above described. In Figure 5 of the drawings, the egg 5 is shown as being treated in a second preparation which includes the dye or coloring solution 7 and a layer of resist substance 8 on the surface of the coloring solution. The egg is preferably wiped dry after immersion in each of the preparations.

By varying the duration of the immersion and the manner of placing the egg in the preparation, different color effects may be obtained, and obviously many different color effects may be secured by immersing the egg in two or more preparations including dye or coloring solutions of different colors.

An egg completely colored in accordance with my invention is shown in Figure 1 of the drawings, having certain portions 9 of one color, other portions 10 of another color, and other portions 11 of different shades caused by overlapping of different colors. The shapes of the various portions 9, 10 and 11 are irregular and different so as to produce a vari-colored marble-like effect.

As above indicated, various dyes or coloring solutions may be utilized and many different resist substances may be used in making my preparation and carrying out the method.

Having thus described the invention, what I claim is:

1. The method of coloring an egg consisting in immersing the egg to be colored in a preparation consisting of a coloring liquid having a layer of oily substance on its surface which adheres to portions of the egg and prevents contact of said coloring liquid with said portions of the egg, and then wiping dry the egg.

2. The method of coloring an egg consisting in placing a coloring liquid in a receptacle, placing upon the surface of the latter a layer of vegetable oil substance which will adhere to an egg and is immiscible with and lighter than said coloring liquid, and immersing and turning an egg to be colored in the preparation thus formed.

3. A preparation for coloring eggs consisting of a body of a coloring liquid having a layer of oily substance upon its surface which will adhere to portions of an egg and repel said liquid.

4. A preparation for coloring eggs, consisting of a body of a coloring liquid having a layer of vegetable oil upon its surface.

(Mrs.) EMMA RIEHL GIBBENS.